United States Patent
Mo et al.

(10) Patent No.: US 9,229,490 B2
(45) Date of Patent: Jan. 5, 2016

(54) INFORMATION PROCESSING DEVICE

(71) Applicants: LENOVO (BEIJING) CO., LTD., Beijing (CN); BEIJING LENOVO SOFTWARE LTD., Beijing (CN)

(72) Inventors: Dafei Mo, Beijing (CN); Zhaowei Hu, Beijing (CN); Chunmei Ye, Beijing (CN); Xiongbing Gong, Beijing (CN)

(73) Assignees: LENOVO (BEIJING) CO., LTD., Beijing (CN); BEIJING LENOVO SOFTWARE LTD., Beijing (CN)

( * ) Notice: Subject to any disclaimer, the term of this patent is extended or adjusted under 35 U.S.C. 154(b) by 205 days.

(21) Appl. No.: 13/628,698

(22) Filed: Sep. 27, 2012

(65) Prior Publication Data
US 2013/0077224 A1    Mar. 28, 2013

(30) Foreign Application Priority Data

Sep. 28, 2011   (CN) .......................... 2011 1 0303297

(51) Int. Cl.
  *H05K 5/00*  (2006.01)
  *H05K 7/00*  (2006.01)
  *G06F 1/16*  (2006.01)
  (Continued)

(52) U.S. Cl.
  CPC ............ G06F 1/1698 (2013.01); G06F 1/1616 (2013.01); G06F 1/1683 (2013.01); H01Q 1/2266 (2013.01); H01Q 1/44 (2013.01); H01Q 13/10 (2013.01); H01Q 21/28 (2013.01)

(58) Field of Classification Search
  CPC .............................. G06F 1/1616; H01Q 1/243
  USPC ............... 361/679.01–679.09, 679.1–679.19, 361/679.31–679.45, 679.55–679.6, 361/724–747; 248/80–88, 155.1–155.5, 248/166–173, 180.1–186.2, 229.1–231.51, 248/271.4, 292.14, 316.1–316.8; 292/1–62, 292/113, 169.11–169.23, 341.11–341.19
  See application file for complete search history.

(56) References Cited

U.S. PATENT DOCUMENTS

2001/0052878 A1   12/2001   Kim et al.
2001/0053672 A1*  12/2001   Masaki ........................... 455/90
(Continued)

FOREIGN PATENT DOCUMENTS

CN   1326241    12/2001
CN   1156939    7/2004
(Continued)

OTHER PUBLICATIONS

First Office Action dated Apr. 28, 2013 of corresponding Chinese application No. 201110303297.5 (11 pages including English translation).
(Continued)

Primary Examiner — Jerry Wu
(74) Attorney, Agent, or Firm — Brinks Gilson & Lione; G. Peter Nichols

(57) ABSTRACT

Provided is an information processing device that includes a first component, including a display unit and a first antenna of the information processing device; a second component, including an arithmetic unit and a radio frequency circuit; the arithmetic unit used for providing a display signal to the display unit; a first connecting means used for connecting the first component and the second component and enabling the first component to rotate relative to the second component; and a second antenna disposed on the first connecting means.

8 Claims, 2 Drawing Sheets

(51) Int. Cl.
  *H01Q 1/22* (2006.01)
  *H01Q 1/44* (2006.01)
  *H01Q 13/10* (2006.01)
  *H01Q 21/28* (2006.01)

(56) References Cited

U.S. PATENT DOCUMENTS

2003/0137468 A1* 7/2003 Kim .............................. 343/895
2004/0224734 A1* 11/2004 Lin ............................. 455/575.7
2009/0179806 A1 7/2009 Ji et al.
2010/0085382 A1* 4/2010 Lundqvist et al. ............ 345/659
2010/0245176 A1* 9/2010 Wong et al. ............ 343/700 MS
2012/0162040 A1* 6/2012 Taura et al. ................... 343/770

FOREIGN PATENT DOCUMENTS

| JP | 2004-343265 A | 12/2004 |
| JP | 2005-333323 A | 12/2005 |
| WO | WO 2006/046712 A1 | 5/2006 |
| WO | WO 2009/154054 A1 | 12/2009 |
| WO | WO 2010/109771 A1 | 9/2010 |

OTHER PUBLICATIONS

Japanese Notice of Reasons for Rejection with English Translation for related Application No. 2012-218570 dated Jul. 21, 2015, 6 pages.

* cited by examiner

INFORMATION PROCESSING DEVICE

This application claims priority to CN 201110303297.5 filed on Sep. 28, 2011, the entire contents of which is incorporated herein by reference.

TECHNICAL FIELD

The present disclosure relates to an information processing device, in particular to an information processing device having a plurality of antenna units.

BACKGROUND

At present, an information processing device such as a notebook computer often utilizes metallic materials as a house containing hardwares such as a display, a mainboard and a processor. In such a case, an antenna (such as an antenna for wifi communication or 3G communication) of an information processing device needs certain electromagnetic clearance area (no metallic material exists in the vicinity thereof) to obtain a higher signal receiving/sending quality, however, the electromagnetic shielding characteristic of a metallic house generally influences the signal receiving/sending quality of the antenna, and therefore it often needs to open the electromagnetic clearance area (for example, through utilizing an integral forming of plastics and metal) on the metallic house. This will generally increase the cost of the information processing device and influence the texture of the metallic house.

In order to solve the technical problem in the prior art, an aspect of the present disclosure provides an information processing device, comprising: a first component, including a display unit and a first antenna of the information processing device; a second component, including an arithmetic unit and a radio frequency circuit, the arithmetic unit used for providing a display signal to the display unit; a first connecting means used for connecting the first component and the second component and enabling the first component to rotate relative to the second component; and a second antenna disposed on the first connecting means.

Further, according to one embodiment of the present disclosure, wherein the first component comprises a first metallic house body used for containing the display unit, and the first metallic house body having a first surface and a second surface; and the first surface of the first metallic house body is opposite to the display screen of the display unit, and is used as the first antenna.

Further, according to another embodiment of the present disclosure, wherein the second component comprises a second metallic house body used for containing the arithmetic unit and the radio frequency circuit, and the second metallic house body having a third surface and a fourth surface, wherein the third surface is an upper surface of the second metallic house body, and the fourth surface is a lower surface of the second metallic house body; and the information processing device has a first operation state and a second operation state based on a relative position of the first surface and the fourth surface.

Further, according to another embodiment of the present disclosure, wherein the information processing device has the first operation state, if the first component clockwise rotates relative to the second component, and if the first surface and the fourth surface do not coincide; and the information processing device has the second operation state, if the first component clockwise rotates relative to the second component, and if the first surface and the fourth surface coincide.

Further, according to another embodiment of the present disclosure, wherein in the first operation state, the first antenna is coupled with the radio frequency circuit, and the second antenna is coupled with the radio frequency circuit; and in the second operation state, the second antenna is coupled with the radio frequency circuit.

Further, according to another embodiment of the present disclosure, the information processing device further comprises: a feed line connected with the radio frequency circuit, the feed line having a feed point; and the radio frequency circuit is used for receiving or sending a radio frequency signal via the feed line.

Further, according to another embodiment of the present disclosure, wherein the feed point is disposed in the first connecting means; and in the first operation state, the feed point is electrically coupled with the first antenna and/or the second antenna.

Further, according to another embodiment of the present disclosure, wherein in the second operation status, the feed point is electrically coupled with the second antenna.

Further, according to another embodiment of the present disclosure, the information processing device further comprises: a frequency divider disposed between the radio frequency circuit and the feed line, being configured to divide frequency of a signal transmitted by the feed line.

DETAILED DESCRIPTION

Each embodiment of the present disclosure will be described in detail with reference to the accompanying figures. Herein, it should be noted that, in the accompanying figures, the same reference sign is given to the component parts that basically possess the same or similar structures and functions, and the repetitive description thereabout will be omitted.

Figure 1:
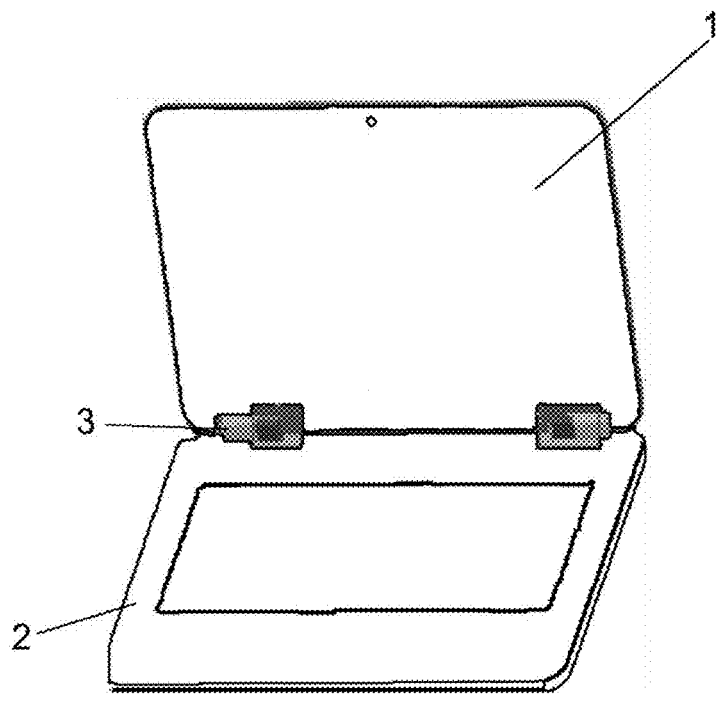
FIG. 1 is a schematic block view illustrating an information processing device according to the embodiment of the present disclosure.

FIG. 1 is a schematic block view illustrating the information processing device according to the embodiment of the present disclosure. As illustrated in FIG. 1, an information processing device such as a notebook computer may comprise a first component 1, a second component 2 and a connecting component 3 connecting the first component 1 and the second component 2 together.

According to the embodiment of the present disclosure, the first component 1 may be the display part of the information processing device (notebook computer), and may comprise any type of display screen and a first antenna. The first component 1 herein comprises a first metallic house body used for containing the display screen. The metallic house body has a first surface and a second surface.

The second component 2 may be the host part of an information processing device, and may comprise hardwares such as an arithmetic unit and a radio frequency circuit. The arithmetic unit herein may be realized by any type of processor, microprocessor or DSP, and may perform a predetermined operation based on a predetermined program. For example, the arithmetic unit may be used for providing a display signal to the display screen. The radio frequency circuit may be realized by any RF circuit, and can send a RF signal to an antenna or receive a RF signal from an antenna. The second component 2 herein comprises a second metallic house body used for containing the arithmetic unit and the radio frequency circuit, and the second metallic house body has a third surface and a fourth surface, wherein the third surface is an upper surface of the second metallic house body, and the fourth surface is a lower surface of the second metallic house body.

The connecting component 3 may be composed of any type of hinge or shaft. The connecting component 3 herein is used for connecting the first component 1 and the second component 2. For example, the two ends of the connecting component 3 such as a hinge or a shaft can be fixed on the first component 1 and the second component 2 respectively, and can enable the first component 1 (the display part) to rotate relative to the second component 2 (the host part).

Herein, according to the embodiment of the present disclosure, the information processing device further comprises a second antenna. The second antenna is disposed on the connecting component. Herein, both the first antenna and the second antenna can be used over any wireless network. For example, the first antenna and the second antenna may be a 3G and/or a wifi antenna.

Below are detailed descriptions of the configuration of the antenna of the information processing device according to each embodiment of the present disclosure.

Figure 2:
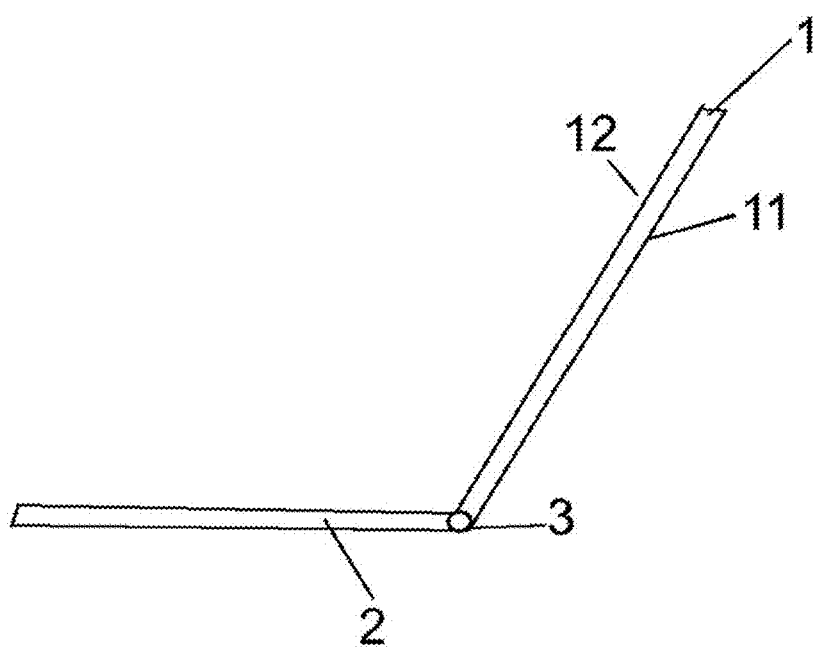
FIG. 2 is a schematic view illustrating a first component of the information processing device according to the embodiment of the present disclosure.

FIG. 2 is a schematic view illustrating the first component of the information processing device according to the embodiment of the present disclosure.

For example, as illustrated in FIG. 2, the first component 1 comprises the first metallic house body used for containing the display screen, and the first metallic house body comprises a first surface 11 and a second surface 12. Herein, the first surface 11 is a metallic surface (i.e., the back of the display unit) away from the display screen side and opposite to the display screen, while the second surface 12 is a metallic surface (i.e., the front of the display unit) at the display screen side. Herein, according to the embodiment of the present disclosure, the first surface 11 on whole can be used as a first antenna.

Figure 3:
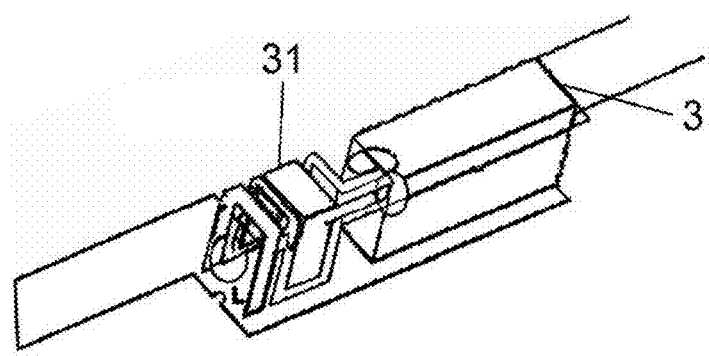
FIG. 3 is a schematic view illustrating a connecting component according to the embodiment of the present disclosure.

FIG. 3 is a schematic view illustrating the structure of the second antenna according to the embodiment of the present disclosure.

As illustrated in FIG. 3, a second antenna 31 is connected with the connecting component 3. Herein, for example, the second antenna 31 can be realized by a slot antenna (FIG. 3). Herein, since the principle of a slot antenna is common knowledge for those skilled in the art, it will be simply described herein. Being different from a general linear antenna, the slot antenna is realized by a metallic antenna with a "square wave" shape. The use of the slot antenna with a detour shape aims at making the length of the antenna as long as possible within a limited space. Herein, since the longer the length of the antenna is, the more the frequency band that can be supported by the antenna is. Therefore, the structure of a slot antenna is adopted by the second antenna 31 according to the embodiment of the present disclosure. For example, according to the embodiment of the present disclosure, the second antenna 31 supporting all frequency bands (such as, all 3G frequency bands, Wi-Fi, etc.) can be constructed within a space of 14×6×10 mm$^3$ through appropriately debugging the space between the slots of the second antenna 31.

Further, the present disclosure is not limited to the situation as illustrated in FIG. 3. For example, the second antenna 31 can be constructed in the connecting component 3, if the connecting component 3 is made of metallic materials. In particular, the surface of the connecting component 3 can be etched into a shape with a "square wave" structure of a slot antenna. In such a case, the connecting component 3 can be used as the second antenna 31.

Further, according to another embodiment of the present disclosure, the second antenna 31 with a structure of a slot antenna can be disposed inside the connecting component 3, if the connecting component 3 is made of non-metallic materials. For example, the connecting component 3 may possess a hollow structure and be used for containing the second antenna 31.

In addition, also, the second antenna 31 with a structure of a slot antenna can be disposed inside the connecting component 3 and an extension of the second antenna 31 is disposed outside the connecting component 3, so as to further increase the length of the second antenna 31.

Further, the information processing device according to each embodiment of the present disclosure may further comprise a feed line (not shown). The feed line is connected with a radio frequency circuit, and has a feed point. Herein, the feed point of the feed line is also disposed in the connecting component 3, and is coupled with the first antenna 11 and the second antenna 31. Herein, the radio frequency circuit sends or receives a radio frequency signal via the feed line Below is the description about the situation when the first antenna and the second antenna are operating.

For example, in a general operation state of the information processing device (such as, the case of opening and using a notebook computer as illustrated in FIG. 1), the information processing device sends data to the radio frequency circuit via a baseband processor (not shown), when the information processing device wirelessly communicates with an external device or an external network. At this time, the radio circuit produces a radio frequency signal and sends the radio frequency signal to the feed point via the feed line. Herein, since the feed point is disposed in the connecting component 3 and is close to the first antenna 11 and the second antenna 31, no matter whether the feed point is directly connected with the first antenna 11 and the second antenna 31, the feed point is electrically coupled with both the first antenna 11 and the second antenna 31 in a case when the feed point has a radio frequency signal. In such a case, both the first antenna 11 and the second antenna 31 can send the radio frequency signal from the feed point, thus achieving the function of the antenna. In the previous description, the second antenna 31 may be an antenna supporting a plurality of frequency bands. Herein, since the first antenna 11 may be a first surface (the back) of the metallic house body of the display screen and it has a large enough area (the display screen of a notebook computer is generally at least more than 10.1 inches), the first antenna 11 may also be used as an antenna supporting a plurality of frequency bands.

Similarly, when the information processing device receives a radio frequency signal from an external device or network, both the first antenna 11 and the second antenna 31 are electrically coupled with the feed point, such that the radio frequency signal from the external device or network can be sent to the radio frequency circuit via the feed line.

Herein, it should be noted that, since there is not any shelter in the direction extended from the first antenna 11 and the second antenna 31 to the outside of the information processing device, both of the two have a very large clearance area, such that the first antenna 11 and the second antenna 31 possess a high radio frequency signal receiving/sending quality.

The above is described the information processing device according to the embodiment of the present disclosure, but the present disclosure is not limited thereto. The information processing device can further possess other operation states.

For example, according to another embodiment of the present disclosure, an information processing device such as a notebook computer may possess a notebook state or a flat state based on a relative position of the first surface (the back of the display screen) of the first metallic house body and the fourth surface (the lower surface of the host part) of the second metallic house body. For example, a connecting component 3 can be configured to enable the first component 1 to clockwise rotate relative to the second component 2, so as to switch between the notebook state and the flat state. In particular, the information processing device can be used as a notebook computer, when the information processing device is opened (i.e., clockwise rotate the first component 1 relative to the second component 2) to a predetermined position (the first surface and the fourth surface do not coincide, such as 120 degrees). Further, the information processing device can be used as a flat computer, when the first component 1 is enabled to clockwise rotate relative to the second component 2 to make the first surface (the back of the display screen) and the fourth surface (the lower surface of the host part) of the second metallic house body coincide (a mode of backward somersault).

In the notebook state of the information processing device, similar to the previous description, since the feed point is disposed in the connecting component 3 and is close to the first antenna 11 and the second antenna 31, the feed point is electrically coupled with both the first antenna 11 and the second antenna 31 in a case when the feed point has a radio frequency signal. In such a case, both the first antenna 11 and the second antenna 31 can send a radio frequency signal from the feed point, thus achieving the function of the antenna. Further, when the information processing device receives a radio frequency signal from an external device or network, the first antenna 11 and the second antenna 31 are also electrically coupled with the feed point, such that the radio frequency signal from the external device or network can be sent to the radio frequency circuit via the feed line.

Further, in the flat state of the information processing device, the first surface (the back of the display screen) used as the first antenna 11 and the fourth surface (the lower surface of the host part) of the second metallic house body coincide, i.e., contact. In such a case, since the fourth surface of the second metallic house body is a metallic surface and the fourth surface is generally used as a ground terminal of the first antenna 11 and a second antenna 31, the first antenna 11 is thus directly grounded and cannot be used as an antenna. Further, in a case when the fourth surface is not used as a ground terminal of the first antenna 11 and the second antenna 31, due to the existence of the fourth surface, the first antenna 11 does not possess a large enough clearance area. In such a case, since the second antenna 31 is disposed on the connecting component 3 and its position does not change with the rotation of the first component 1, the second antenna 31 is capable of being coupled with the radio frequency circuit. Therefore, the information processing device is still capable of receiving/sending a radio frequency signal through the second antenna 31. In particular, in the flat state of the information processing device, the feed point of the feed line connected with the radio frequency circuit is coupled with the second antenna 31. In such a case, the second antenna 31 can send the radio frequency signal from the feed point, thus achieving the function of the antenna. Further, when the information processing device receives a radio frequency signal from an external device or network, the second antenna 31 can also be electrically coupled with the feed point, such that the radio frequency signal from the external device or network can be sent to the radio frequency circuit.

According to the above-described configurations, through using a portion of a metallic house of the information processing device as a first antenna and using a portion of a connecting component connecting the first component 1 and the second component 2 as a second antenna, the complexity of the design for the information processing device can be reduced while the function that the information processing device wirelessly communicates with an external device or network can be achieved. Further, since both the first antenna and the second antenna possess a large enough clearance area, the radio frequency signal receiving/sending quality of the first antenna and the second antenna is very high, thus achieving a good effect of wireless communication. In addition, a plurality of operation modes of the information processing device can be supported by the design of a first antenna and a second antenna according to the embodiment of the present disclosure (such as a notebook state and a flat state). Therefore, even if the information processing device is in the operation mode, the information processing device can be allowed to carry through wireless communication by an antenna design comprising a first antenna and a second antenna according to the embodiment of the present disclosure, so as to enhance the usability of the information processing device.

Further, according to another embodiment of the present disclosure, the information processing device can further comprise a frequency divider. The frequency divider can be disposed between the radio frequency circuit and the feed line, and can divide frequency of a signal transmitted by the feed line. Herein, the frequency divider may be realized by any type of frequency divider. Herein, as described above, since the first antenna 11 and the second antenna 31 can support a radio frequency signal of a plurality of frequency bands (such as all frequency bands of 3G and wifi), various radio frequency signals with different frequencies may be transmitted on the feed line coupled with the first antenna 11 and the second antenna 31. In such a case, dividing the radio frequency signals transmitted on the feed line into signals with different frequency bands (such as 3G of 1800 MHz, 1900 MHz, wifi of 2.4 GHz, etc.) via the frequency divider can merely utilize the first antenna 11 and the second antenna 31 to receive or send a radio frequency signal with different frequencies, such that it does not need to design a plurality of antennas specific to various frequencies. Therefore, disposing a frequency divider between a radio frequency circuit and a feed line can, in a case of not increasing complexity of the antenna design, allow the information processing device to send/receive a radio frequency signal with various frequencies at the same time. Herein, it should be noted that, in a case when signals possibly transmitted on the feed line are divided into various radio frequency signals with different frequencies, it needs a plurality of radio frequency circuits, the number of which corresponding to the number of the divided various radio frequency signals, to receive/send the corresponding radio frequency signals.

The above are described in details each of the embodiments of the present disclosure. However, those skilled in the art should understand that, many modifications, combinations or sub-combinations can be made without departing from the principle and scope of the present disclosure, and such modifications, combinations or sub-combinations should be considered as falling into the scope of the present disclosure.

What is claimed is:

1. An information processing device, comprising:
    a first component, including a display unit and a first antenna of the information processing device;
    a second component, including an arithmetic unit and a radio frequency circuit;
    the arithmetic unit used for providing a display signal to the display unit;
    a first connector connecting the first component and the second component and enabling the first component to rotate relative to the second component;
    a second antenna disposed on the first connector means; and,
    a feed line connected with the radio frequency circuit, the feed line having a feed point;
    wherein the radio frequency circuit is used for receiving or sending a radio frequency signal via the feed line,
    the first component comprises a first metallic house body used for containing the display unit and having a first surface and a second surface,
    the first surface of the first metallic house body is used as the first antenna, and
    the second component comprises a second metallic house body used for containing the arithmetic unit and the radio frequency circuit, and the second metallic house body has a third surface and a fourth surface,
    the information processing device has a first operation state and a second operation state based on a relative position of the first surface and the fourth surface, and
    in the second operation status, the first antenna and the fourth surface contact, and the first antenna is directly grounded by the fourth surface.

2. The information processing device as claimed in claim 1, wherein:
    the first surface of the first metallic house body is opposite to a display screen of the display unit.

3. The information processing device as claimed in claim 2, wherein:
    the third surface is an upper surface of the second metallic house body, and the fourth surface is a lower surface of the second metallic house body.

4. The information processing device as claimed in claim 3, wherein:
    the information processing device has the first operation state, if the first component rotates relative to the second component to open the first component from the second component, and if the first surface and the fourth surface do not coincide; and
    the information processing device has the second operation state, if the first component rotates relative to the second component to open the first component from the second component, and if the first surface and the fourth surface coincide.

5. The information processing device as claimed in claim 4, wherein:
    in the first operation state, the first antenna is coupled with the radio frequency circuit, and the second antenna is coupled with the radio frequency circuit; and
    in the second operation state, the second antenna is coupled with the radio frequency circuit.

6. The information processing device as claimed in claim 1, wherein:
    the feed point is disposed in the first connector; and
    in the first operation state, the feed point is electrically coupled with the first antenna and/or the second antenna.

7. The information processing device as claimed in claim 1, wherein in the second operation status, the feed point is electrically coupled with the second antenna.

8. The information processing device as claimed in claim 1, further comprising a frequency divider disposed between the radio frequency circuit and the feed line, being configured to divide a frequency of a signal transmitted by the feed line.

* * * * *